(12) United States Patent
Gish et al.

(10) Patent No.: US 8,244,869 B2
(45) Date of Patent: Aug. 14, 2012

(54) SYSTEM AND METHOD FOR STARTING SERVER SERVICES

(75) Inventors: James William Gish, Sudbury, MA (US); Akbar Ali Ansari, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 12/270,024

(22) Filed: Nov. 13, 2008

(65) Prior Publication Data
US 2009/0132692 A1  May 21, 2009

Related U.S. Application Data

(60) Provisional application No. 60/988,377, filed on Nov. 15, 2007.

(51) Int. Cl.
*G06F 15/173* (2006.01)
(52) U.S. Cl. ..................... 709/226; 709/203

(58) Field of Classification Search .............. 709/203, 709/219, 220, 221, 222, 225, 226
See application file for complete search history.

(56) References Cited

U.S. PATENT DOCUMENTS

| 2005/0010376 A1* | 1/2005 | Bodin et al. ............... 702/188 |
| 2005/0262189 A1* | 11/2005 | Mamou et al. ............... 709/203 |
| 2006/0140144 A1* | 6/2006 | Bruner et al. ............... 370/328 |
| 2009/0157457 A1* | 6/2009 | Huuhtanen et al. ............... 705/7 |

* cited by examiner

*Primary Examiner* — Barbara Burgess
(74) *Attorney, Agent, or Firm* — Fliesler Meyer LLP

(57) ABSTRACT

In one embodiment, services are not loaded if they are not needed by the user and if no services needed by the user are dependent upon them. In one embodiment, server services are represented as nodes in a graph data structure. Connections between the nodes indicate dependencies between the server services. The graph is sorted to create an ordered list of services which can be used to startup the services. In another embodiment a server services manager reads license files and user inputs and marks the ordered list of services to indicate which services are to startup.

17 Claims, 3 Drawing Sheets

SYSTEM AND METHOD FOR STARTING SERVER SERVICES

CLAIM OF PRIORITY

This application claims benefit to the following U.S. Provisional Patent Application:

U.S. Provisional Patent Application No. 60/988,377 entitled "System and Method for Starting Server Services," by James William Gish et al., filed Nov. 15, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application server environments and in particular to a system and method for loading server services.

BACKGROUND

Server software, such as application servers, can provide application infrastructure for modern business systems. Application servers can support applications that share data and resources with other systems, and can generate dynamic information for Web pages and other user interfaces. The application servers can provide a layer of functions and services between Web servers and underlying applications and databases. As companies deploy large applications to support secure transactions and use Web and XML protocols, the growing complexity of the applications can require a managed environment for the applications. Globally deployed applications with complex business logic potentially servicing tens of thousands of concurrent users in real-time, require a scalability and reliability that makes quality application servers a necessity.

Application Servers can provide functions and services, such as load balancing, fault tolerance, web services, network transparency, legacy integration, transaction management, security, messaging, multi-threading, persistence, database connectivity, resource pooling, and development, testing, and packaging facilities. Built-in functionality from the application server can speed application development and can relieve developers of the effort and expense of creating important services on their own. Applications can then provide more functionality, be developed faster, be less costly to maintain, and provide a greater return on investment.

SUMMARY

Application servers can provide a variety of functionality. This functionality is embodied in the different features available to a user. Each feature can be composed of a number of services represented by a service group. A customer may not use every feature available and may either disable some features or buy an application server that includes a more limited number of features. For example, in the case of WebLogic Server™ produced by Oracle Corporation of Redwood Shores, Calif., a customer may purchase the full WebLogic Server™ or a WebLogic Express Server™ which comes with fewer available features. Often, even with the reduced functionality, all services are loaded when the application server is started. The customer does not receive the benefits of faster startup time and smaller disk footprint that one would expect from having fewer available features. This is due to how services interact. Each service can depend on other services and so there must be an order to service startup. Additionally, these dependencies may not be explicitly declared and after a significant amount of development time the knowledge of the dependencies can become lost. It may no longer be clear why the services start in a given order, only that that order works.

Disclosed herein is a system and method for starting server services. In one embodiment, services are not loaded if they are not needed by the user and if no services needed by the user are dependent upon them. In one embodiment, server services are represented as nodes in a graph data structure. Connections between the nodes indicate dependencies between the server services. The graph is sorted to create an ordered list of services which can be used to startup the services. In another embodiment a server services manager reads license files and user inputs and marks the ordered list of services to indicate which services are to startup.

DETAILED DESCRIPTION

Server functionality can be implemented through internal service classes, i.e. services. These services in combination can form service groups that represent features, the functionality of the server at the customer level. For example, service features may include Enterprise Java Beans (EJBs), Java Message Service (JMS), and Connectors. The services and service groups can be modeled through a number of Java classes: Service, ServiceGroup, ServiceModel, ServiceActivator, and ActivatedService. The basic model can be constructed by defining a ServiceModel which can consist of a set of ServiceGroup(s). Each ServiceGroup can consist of a list of Service(s). Each Service can specify a service class String and optionally a ServiceActivator. The ServiceActivator can act as a stand in for a service class and serves as a convenient place to do license checking for a service to determine whether the service should be loaded and started. The start( ) method on a ServiceActivator class can perform the license check and load and start the service class if the service is licensed.

In one embodiment, a system for loading server services comprises a representation of a plurality of server services. The representation indicates dependencies between server services from the plurality of server services. The system also comprises a server services model component. The server services model component receives the representation of the plurality of server services and sorts the representation of the plurality of server services to create an ordered list of server services. The system also comprises a server services manager component. The server services manager component can receive the ordered list of server services, read license files to determine which server services are licensed, and update the ordered list of server services based on the license files to indicate which services to start. The services to start include at least some licensed services and services that the at least some licensed services depend on. The server services manager component can also start the server services according to the ordered list of server services.

Figure 1:
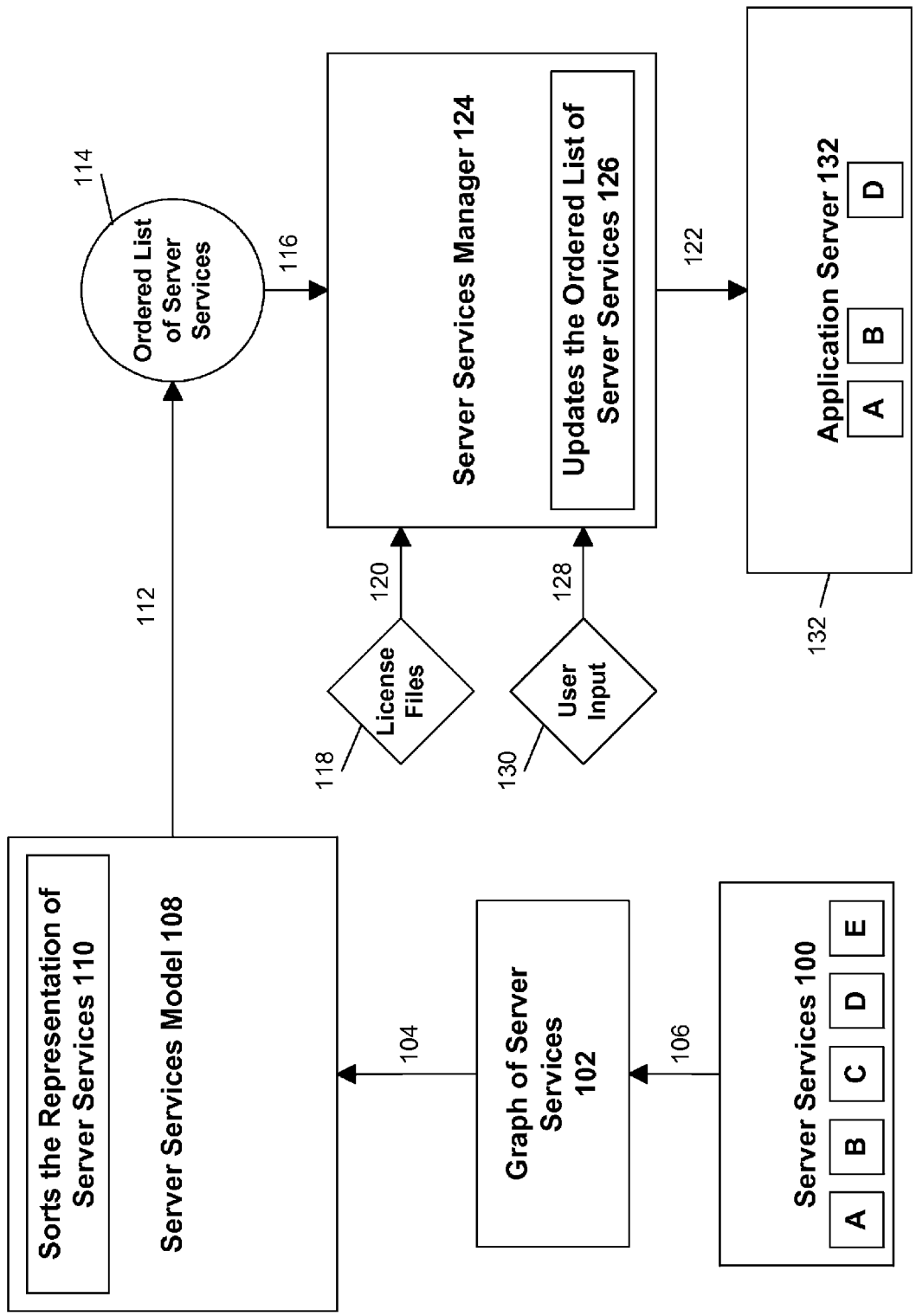
FIG. 1 shows a system for starting server services in accordance with an embodiment.

FIG. 1 shows a system for starting server services in accordance with an embodiment. A plurality of server services is available 100; the server services are represented in FIG. 1 as server services A-E. In one embodiment, these services are represented 106 as a graph data structure 102. A server services model component 108 receives the graph of server services 104 and sorts the graph of server services 110. When the server services model component sorts the graph of server services it creates 112 an ordered list of server services 114. A server services manager 124 receives the ordered list of server services 116. The server services manager reads 120 license files 118 and updates the ordered list of server services 126 based on the license files to indicate which server services to start. In one embodiment, the server services manager also receives 128 a user input 130 and updates the ordered list of server services 126 based on the license files and the user input to indicate which server services to start. The server services manager starts 122 server services based on the updated ordered list of server services on an application server 132. The server services to start can include at least some licensed server services and server services on which the at least some licensed server services depend.

In one embodiment, a method for loading server services comprises representing a plurality of server services as a graph data structure comprising nodes and connections between nodes. The nodes of the graph data structure represent server services from the plurality of server services and the connections between nodes represent dependencies between server services. The method also comprises sorting the graph data structure to create an ordered list of nodes, reading license files to determine which services are licensed services, and updating the ordered list of nodes based on the license files to indicate the services to start. The services to start include at least some licensed services and services that the at least some licensed services depend on. In one embodiment the method for loading server services also comprises receiving startup options from a user input, and updating the ordered list of nodes based on the startup options and the license files to indicate the at least some licensed services to start. The at least some licensed services to start include services indicated in the startup options and license files, and services which the services indicated in the startup options and license files depend on.

In one embodiment, the ordered list of nodes indicates the order of service startup. In one embodiment, the ordered list of nodes is updated by marking a first group of nodes according to the license files; marking a second group of nodes wherein the second group of nodes contains nodes which are connected to any node from the first group; and wherein marked nodes indicate services to start.

Figure 2:
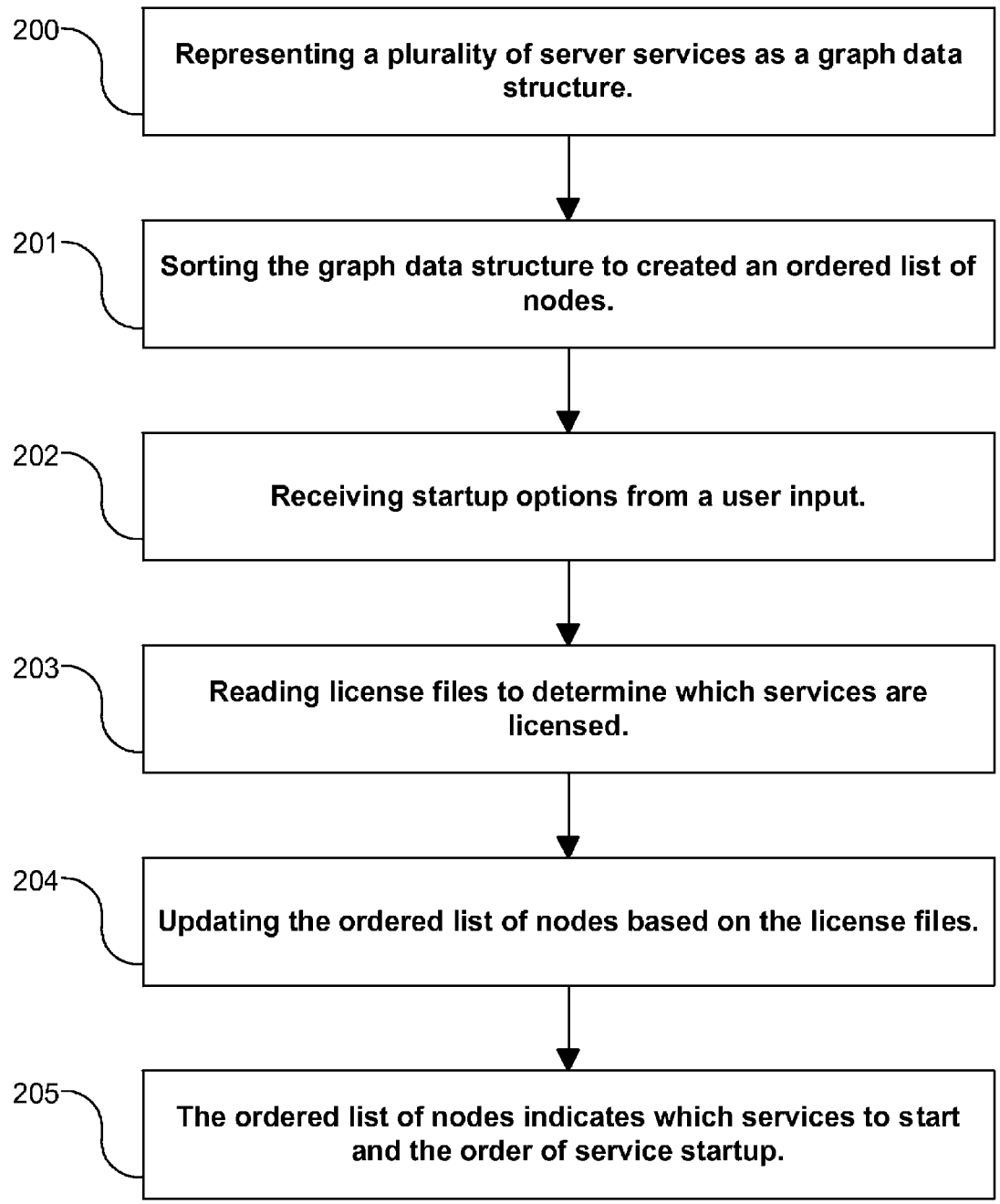
FIG. 2 shows a method for starting server services in accordance with an embodiment.

FIG. 2 shows a method for loading server services in accordance with an embodiment. At step 200, a plurality of server services are represented as a graph data structure comprising nodes and connections between nodes. The nodes of the graph data structure represent server services from the plurality of server services and wherein the connections between nodes represent dependencies between server services. At step 201, the graph data structure is sorted to create an ordered list of nodes. At step 202, startup options are received from a user input. At step 203, license files are read to determine which services are licensed. At step 204, the ordered list of nodes is updated based on the license files. At step 205, the ordered list of nodes indicates which services to start and the order of service startup.

Figure 3:
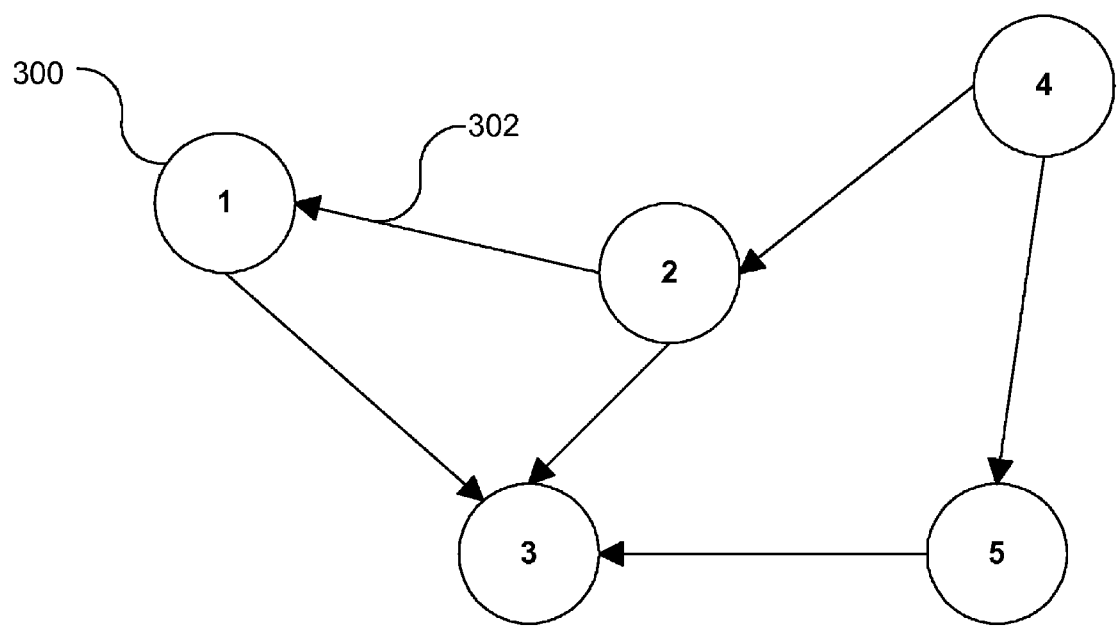
FIG. 3 shows a graph data structure in accordance with an embodiment.

FIG. 3 shows a graph data structure in accordance with an embodiment. Server services can be represented as nodes 300 in a graph data structure. Connections between the nodes 302 indicate dependencies between the server services. The graph is sorted to create an ordered list of services which can be used to startup the services. For example, in FIG. 3 service 1 is dependent on service 2, so if service 1 is needed then service 2 must be started before service one. Similarly, service 3 is dependent on services 1, 2, and 5, so if service 3 is needed then services 1, 2, and 5 must be started before service 3.

In one embodiment, a ServiceModel can be defined as a framework for representing server services and their dependencies and other properties that is used as a basis for performing analysis to determine which services are started and the order in which they are started. A ServiceGroup can be defined as a collection of Service(s) in the ServiceModel. A ServiceGroup can provide an encapsulation of related services, e.g. the JMSServiceGroup or the EJBServiceGroup. A Service can be defined as a member of a ServiceGroup which represents a server service class.

The Service class can have the following properties and methods of note:

String serviceClassName—the name of an AbstractServerService class or a ServiceActivator class.

ServiceActivator activator—an (optional) ServiceActivator which can be used to test if the service is licensed (or actually packaged with the server), prior to loading and starting it.

Vector predecessors—a collection of Service(s) that if needed in the server must precede this Service in the startup sequence. (Note that a successor, 's', to this Service, 't', is represented as 't' is a predecessor of 's'.)

Vector dependents—a collection of Services(s) which depend on this Service such that if the dependents are started, this Service must also be started and must precede its dependents in the startup sequence.

Vector dependencies—a collection of Service(s) upon which this Service depends. Thus, if this Service is needed, its dependencies are also needed and must precede this Service in the startup sequence.

boolean isConfigured—true if and only if the service is turned on via configuration.

boolean isNeeded( )—computes whether this Service needs to be started. Services for which isConfigured is true need to be started. Furthermore, if this Service has dependents and those Service(s) are needed, then this Service is needed. Thus, is Needed( ) is a recursive method (that saves its result).

addDependent(Service s)—add s as a dependent of this Service.

addDependency(Service s)—add s as a dependency of this Service.

In one embodiment, server services are sorted for startup based on how the services depend on one another. Information about these dependencies can be stored in each Service class as dependencies and dependents. For example, if service A requires/uses services B & C and A is needed (e.g. isConfigured==true), then both services B & C must be started before A. Then, A.dependencies={B,C}; B.dependents={A}; and C.dependents={A}.

The ServiceGroup class can have the following properties and methods of note:

Vector serviceList—the list of Service(s) that constitute the group.

boolean isConfigured—set to true if the server configuration indicates that this group is to be started. Serves as the default value for all Service(s) as they are added to the ServiceGroup.

Service addServiceClass(String serviceClass)—creates a Service object with the specified class name and adds it to the group.

void addService(Service service)—adds the specified Service object to the group.

There also can be convenience methods for getting dependencies and getting needed services based on applying the Service level methods to all services in the group and collecting the results.

The ServiceModel class can have the following properties and methods of note:

Vector serviceGroups—the collection of ServiceGroup(s) that comprise the model.

addServiceGroup(ServiceGroup f)—adds a ServiceGroup into the serviceGroups.

Vector getOrderedServices( )—returns a Vector of all needed Services from the ServiceModel in the order in which they are to be started.

In one embodiment, this order is computed by performing a topological sort on all the Services based on their dependencies and predecessor/successor relations.

In one embodiment, a ServerServicesManager can receive an ordered list of Service(s) from the ServerServicesModel. When createService(Service) is called and a ServiceActivator is defined in the Service, the activator can be returned as is. Otherwise, if no activator is defined for the Service, the service class can be instantiated and returned as it currently is.

In one embodiment, if an activator is present, it can be instantiated and upon calling start( ) on the activator, it can check whether the license is available. This is factored in to the decision of whether or not to start the service. If the service specified by the activator's service class is to be started, then it is both instantiated and started by the start( ) method of the ServiceActivator.

The ServiceActivator and ActivatedService Classes

In one embodiment, the ServiceActivator class is an abstract class that extends AbstractServerService. It can implement start( ), stop( ) and halt( ) like other server services classes and has an abstract method, boolean isEnabled( ), that must be implemented by classes that extend it. It also can define an abstract method, String getServiceClass( ), which when defined by an extending class, returns the name of the service implementation class.

One advantage of defining and using ServiceActivator classes instead of class names of AbstractServerServices, is that the memory and runtime costs of instantiating a service class can be deferred until the class is needed. Note that because the only coupling between an Activator class and the actual service implementation class is via the service class name, an activator can be loaded and started without doing classloading of the service implementation unless needed. Also, for certain services, such as Service Component Architecture (SCA), it can enable the Activator to handle determining the presence of the actual container code and perform a null start operation on the activator without generating errors.

In one embodiment, if a ServiceActivator is used to front-end an actual service implementation, then the implementation should extend the abstract class ActivatedService instead of AbstractServerService. The abstract methods are startService( ), stopService( ) and haltService( ). Upon instantiation of the ActivatedService, the serviceActivator is set on the instance.

In one embodiment, a Service Plugin is used in place of an Activator. Service Plugins are deployed in a pre-defined location which the server examines on startup. If the server finds plugins that meet predetermined criteria, the server inserts them into the service dependency graph according to any dependencies specified by the plugin. Then, when the dependency graph is sorted, the plugin automatically is started in the correct order relative to all the other server services.

Configuring Service Features

In one embodiment, the system can include a properties file that allows for defining one or more server types, or set of services to be loaded, and the service features to be disabled for each server type.

```
connector-services weblogic.t3.srvr.feature.ConnectorServiceGroup
ejb-services weblogic.t3.srvr.feature.EJBServiceGroup
jms-services weblogic.t3.srvr.feature.JMSServiceGroup
# SERVER CONFIGS
test-disabledServices jms-services connector-services
wlx-disabledServices ejb-services jms-services connector-services
```

In one embodiment, a user can specify a server of a particular type to be started using the command line. The command line option—DserverType=<type> is used, where <type> in the above example would either be "test" or "wlx". This file can be read by the ServerServicesManager to set the isConfigured property of the specified groups to false.

In one embodiment, the user can specify a server of a particular type to be started using the properties file. In another embodiment, a user can specify a server of a particular type to be started using an xml file:

```
<server-configs>
    <server-config name = "test">
        <disabled-services>
            <service>JMS</service>
            <service>Connector</service>
        </disabled-services>
    </server-config>
    <server-config name = "WLX">
        <disabled-services>
            <service>EJB</service>
            <service>JMS</service>
            <service>Connector</service>
        </disabled-services>
    </server-config>
</server-configs>
```

Licensing and the Server Service Model

In one embodiment, an interface can be used to add and manage licensing in the server. Licensing code can be consolidated with several methods. A check method can check each service against the license file to determine if the service is licensed. Another method can be used to handle any exceptions that may be thrown by the check method. Additionally, a boolean check method can be used to check each service against the license file and return only a true/false value depending on the service's license status.

In one embodiment, if you define a ServiceActivator to be used to front-end a service implementation, you have to define a boolean check method to check the licensing. The license check can be used for the boolean check method and returns true if a license is available and false if it is not. This would allow the Service startup to be skipped if the license is not available.

Licensing and Service Startup

In one embodiment, if the service is not licensed service startup can be skipped unless some other service which is needed depends on the unlicensed service. If this is the case, the service can be started and runtime checks can be used to prevent customer access. For example, an internal application may depend on Enterprise Java Beans (EJB), EJB can be deployed regardless of whether the customer has an EJB license. Similarly, there may be other services which depend on clustering code which will require that the cluster service be started without regard to licensing.

In one embodiment, if the service is licensed, it is started up unless it is not configured and no other services are dependent on it.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMS, RAMs, EPROMS, EEPROMS, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, virtual machines, computing environments, and software development systems may use and benefit from the invention.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for loading server services comprising:
   providing an application server, executing on a computer including a computer readable medium and processor, wherein functionality provided by the application server is embodied in a plurality of features, each of which includes one or more server services of a plurality of server services that are internal service classes available on the application server;
   representing the plurality of server services as a graph data structure comprising nodes and a plurality of connections between the nodes;
   wherein each node in the graph data structure represents a different server service, and wherein the plurality of connections between nodes indicate dependencies between those server services, and wherein the application server is configured to start a particular server service only after all server services on which the particular server service depends have been started;
   when the application server is started,
      sorting the graph data structure to create an ordered list of nodes based on the plurality of connections between the nodes;
      reading license files to determine which of the plurality of server services are licensed services;
      receiving startup options from a user input;
      updating the ordered list of nodes based on the license files and the startup options to indicate which server services to start, wherein the server services to start include
         a set of server services which includes those server services that are both licensed services and which were indicated in the startup options, and
         other server services on which the server services in the set of server services depend; and
      loading only the server services in the set of server services, and the other server services upon which the server services in the set of server services depend, during startup according to the ordered list.

2. The method of claim 1 further comprising: wherein the ordered list of nodes indicates the order of service startup.

3. The method of claim 1 wherein updating the ordered list of nodes comprises:
   marking a first group of nodes according to the license files;
   marking a second group of nodes wherein the second group of nodes contains nodes which are connected to any node from the first group; and wherein marked nodes indicate services to start.

4. The method of claim 1 wherein sorting the graph data structure to create an ordered list of nodes comprises performing a topological sort on the graph data structure.

5. The method of claim 1 further comprising:
   wherein the ordered list of nodes indicates the order of service startup.

6. The method of claim 1 wherein updating the ordered list of nodes comprises:
   marking a first group of nodes according to the license files;
   marking a second group of nodes according to the user input;
   marking a third group of nodes wherein the third group of nodes contains nodes which are connected to any node from the first or second groups; and
   wherein marked nodes indicate services to start.

7. The method of claim 1 wherein receiving startup options from a user input comprises receiving a list of services to be disabled.

8. The method of claim 1 wherein the user input is one of:
   a properties file;
   an xml file; and
   a command line.

9. A system for loading server services comprising:
   an application server, executing on a computer including a computer readable medium and processor;
   a plurality of server services that are internal service classes available on the application server, wherein functionality provided by the application server is embodied in a plurality of features, each of which includes one or more server services of the plurality of server services;
   a representation of the plurality of server services wherein the representation comprises nodes and a plurality of connections between the nodes, wherein each node in the representation represents a different server service, and wherein the plurality of connections between the nodes indicate dependencies between those server services, and wherein the application server is configured to start a particular server service only after all server services on which the particular server service depends have been started;
- a server services model component wherein when the application server is started, the server services model component
  - receives the representation of the plurality of server services, and
  - sorts the representation of the plurality of server services to create an ordered list of server services based on the plurality of connections between the nodes; and
- a server services manager component wherein the server services manager component can receives the ordered list of server services,
  - reads license files to determine which of the plurality of server services are licensed services,
  - receives startup options from a user input;
  - updates the ordered list of server services based on the license files and the startup options to indicate which server services to start, wherein the server services to start include
    - a set of server services which includes those server services that are both licensed services and which were indicated in the startup options, and
    - other server services on which the server services in the set of server services depend; and
  - loads only the server services in the set of server services, and the other server services upon which the server services in the set of server services depend, during startup according to the ordered list of server services.

10. The system of claim 9 wherein the representation of the plurality of server services is a graph data structure comprising nodes and connections between nodes wherein the nodes represent the plurality of server services and the connections between nodes represent dependencies between server services from the plurality of server services.

11. The system of claim 10 wherein the server services model performs a topological sort on the graph data structure to create an ordered list of server services.

12. The system of claim 9 wherein update the ordered list of server services comprises:
- marking a first group of nodes according to the license files;
- marking a second group of nodes wherein the second group of nodes contains nodes which are connected to any node from the first group; and
- wherein marked nodes indicate services to start.

13. The system of claim 9 wherein update the ordered list of server services comprises:
- marking a first group of nodes according to the license files;
- marking a second group of nodes according to the user input;
- marking a third group of nodes wherein the third group of nodes contains nodes which are connected to any node from the first or second groups; and
- wherein marked nodes indicate services to start.

14. A computer readable storage device containing code for loading server services comprising:
- providing an application server, wherein functionality provided by the application server is embodied in a plurality of features, each of which includes one or more server services of a plurality of server services that are internal service classes available on the application server;
- representing the plurality of server services as a graph data structure comprising nodes and a plurality of connections between the nodes;
- wherein each node in the graph data structure represents a different server service, and
- wherein the plurality of connections between nodes indicate dependencies between those server services, and wherein the application server is configured to start a particular server service only after all server services on which the particular server service depends have been started;
- when the application server is started;
- sorting the graph data structure to create an ordered list of nodes based on the plurality of connections between the nodes;
- reading license files to determine which of the plurality of server services are licensed services;
- receiving startup options from a user input;
- updating the ordered list of nodes based on the license files and the startup options to indicate which server services to start, wherein the server services to start include
- a set of server services which includes those server services that are both licensed services and which were indicated in the startup options, and other server services on which the server services in the set of server services depend; and
- loading only the server services in the set of server services, and the other server services upon which the server services in the set of server services depend, during startup according to the ordered list.

15. The computer readable medium of claim 14 further comprising: wherein the ordered list of nodes indicates the order of service startup.

16. The computer readable medium of claim 14 wherein updating the ordered list of nodes comprises:
- marking a first group of nodes according to the license files;
- marking a second group of nodes wherein the second group of nodes contains nodes which are connected to any node from the first group; and
- wherein marked nodes indicate services to start.

17. The computer readable medium of claim 14 wherein sorting the graph data structure to create an ordered list of nodes comprises performing a topological sort on the graph data structure.

* * * * *

UNITED STATES PATENT AND TRADEMARK OFFICE
CERTIFICATE OF CORRECTION

PATENT NO.         : 8,244,869 B2
APPLICATION NO.    : 12/270024
DATED              : August 14, 2012
INVENTOR(S)        : Gish et al.

Page 1 of 1

It is certified that error appears in the above-identified patent and that said Letters Patent is hereby corrected as shown below:

In column 2, line 12, after "that" delete "that".

In column 4, line 50, delete "is Needed( )" and insert -- isNeeded( ) --, therefor.

In column 5, line 24-26, delete "In one embodiment, .......... relations." and insert the same on Col. 5, Line 23, after "started." as a continuation of the same paragraph.

In column 7, line 29, delete "ROMS," and insert -- ROMs, --, therefor.

In column 7, line 29, delete "EPROMS, EEPROMS," and insert -- EPROMs, EEPROMs, --, therefor.

In column 10, line 22, in Claim 14, delete "is started;" and insert -- is started, --, therefor.

Signed and Sealed this
Twentieth Day of November, 2012

David J. Kappos
*Director of the United States Patent and Trademark Office*